Sept. 22, 1964   G. RISKE ETAL   3,149,698
AIRLINE LUBRICATOR
Filed July 28, 1961   3 Sheets-Sheet 1

INVENTORS
GILBERT RISKE
BY  JOHN B. RITZEMA

John N. Wolfram
ATTORNEY

Sept. 22, 1964     G. RISKE ETAL     3,149,698

AIRLINE LUBRICATOR

Filed July 28, 1961     3 Sheets-Sheet 2

INVENTORS
GILBERT RISKE
JOHN B. RITZEMA

BY John N. Wolfram

ATTORNEY

Sept. 22, 1964     G. RISKE ETAL     3,149,698
AIRLINE LUBRICATOR

Filed July 28, 1961     3 Sheets-Sheet 3

INVENTORS
GILBERT RISKE
BY JOHN B. RITZEMA

John N. Wolfram
ATTORNEY

United States Patent Office 3,149,698
Patented Sept. 22, 1964

3,149,698
AIRLINE LUBRICATOR
Gilbert Riske, Lombard, and John B. Ritzema, Des Plaines, Ill., assignors to Parker-Hannifin Corporation, Cleveland, Ohio, a corporation of Ohio
Filed July 28, 1961, Ser. No. 127,633
26 Claims. (Cl. 184—55)

This invention relates to airline lubricators of the type for entraining oil in finely divided form into air which is being supplied under pressure to a pneumatic device for operating the same, and is more particularly concerned with lubricators of the drip type in which oil is forced by air under pressure into a feed passage from which it drips into the air being delivered to the pneumatic device.

Airline lubricators of this type include a body having a main passage therethrough for delivery of air to the pneumatic device, and a reservoir for holding a supply of oil. A valve in the main passage controls the flow of air therethrough so as to maintain a higher pressure at the inlet port than at the outlet port. The differential in such pressures is utilized for forcing oil from the reservoir to the main passage by connecting the higher inlet pressure to the upper portion of the reservoir for pressurizing the oil therein and exposing the oil at the bottom of the reservoir to the lower pressure in the outlet port. Thus the upper portion of the reservoir must always be connected to the upstream or inlet side of the valve and the lower portion to the downstream or outlet side. In such lubricators it is desirable to provide a filler opening in the body through which the supply of oil in the reservoir may be replenished without detaching the reservoir from the body. In order to have a simplified structure it is necessary that the filler opening be in an off-center location in the body. This sometimes leads to complications in that when the lubricator is mounted close to the side of a machine the filler opening may be on the side of the lubricator next to the machine when the inlet and outlet ports are properly oriented to fit the air supply piping. With the filler opening in this position it is not readily accessible when it is desired to fill the reservoir.

Rotation of the lubricator 180° brings the filler opening to an accessible position away from the side of the machine but reverses the position of the inlet and outlet ports. The latter is undesirable since it requires rearrangement of the piping to and from the lubricator.

One of the objects of the present invention is to solve this difficulty by providing a lubricator in which a simple reversal of one of the lubricator parts conditions the lubricator so that the inlet port becomes the outlet port and vice versa whereby the lubricator may be rotated 180° to bring the filler opening to an accessible position away from the machine without necessitating rearrangement of the piping.

It is another object to provide a lubricator of the type described in which parts of the passages connecting the inlet port to the upper side of the reservoir and the outlet port to the lower side are located in a cap detachably connected to the lubricator body and in which reversal of these connections is accomplished by reversing the position of the cap on the body.

It is another object to provide a drip type lubricator with provision for reversing the direction of air flow therethrough in which an indicator on the cap automatically and correctly indicates the proper direction of air flow through the body.

It is another object to provide a drip type lubricator in which there is a valve for controlling the main flow of air therethrough and in which there is an improved method of locking the valve in a set position.

It is another object to provide a locking structure for the valve controlling flow of air through the main passage which structure also serves to seal the valve against leakage therearound.

It is another object to provide an improved valve structure for controlling the amount of oil which may be forced from the reservoir into the drip passage.

It is another object to provide an indicator for designating the rotative position of the valve in the main air passage.

It is another object to provide a drip type lubricator with all of the above and other features and still maintain a simple, compact structure, which is economical to manufacture.

Other objects of the invention will be apparent from the following description and from the drawings in which:

FIG. 4 is a bottom view of a plate forming part of the mechanism for locking the valve controlling the main air stream and also serving as part of an indicator to indicate the rotative position of the valve.

FIG. 5 is a partial side view showing part of a quick clamp mechanism for attaching the reservoir to the body, FIG. 6 is a partial view along the lines 6—6 of FIG. 2.

Figure 1:
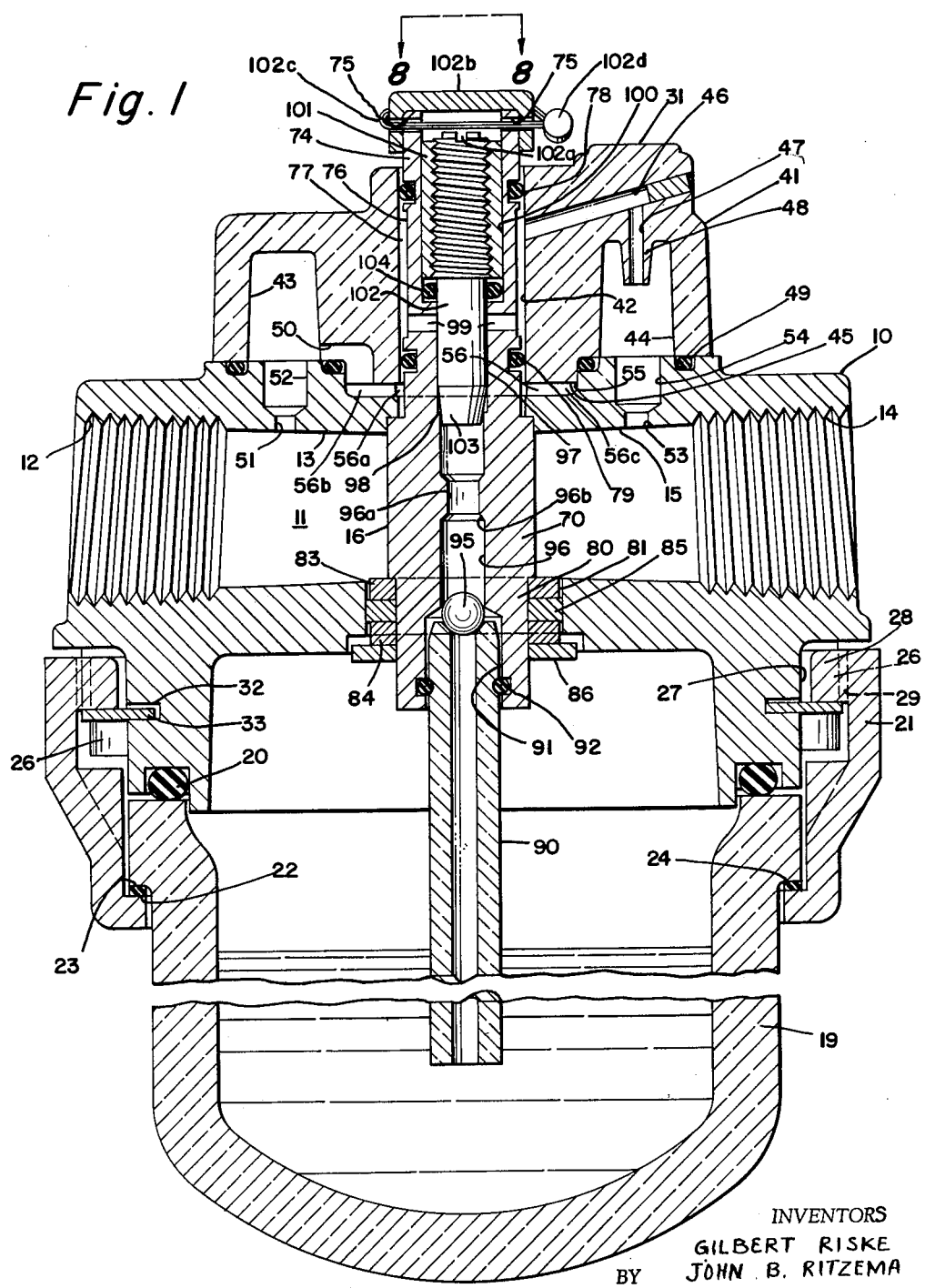
FIG. 1 is a vertical cross section view through the lines 1—1 of FIG. 3.
Figure 7:
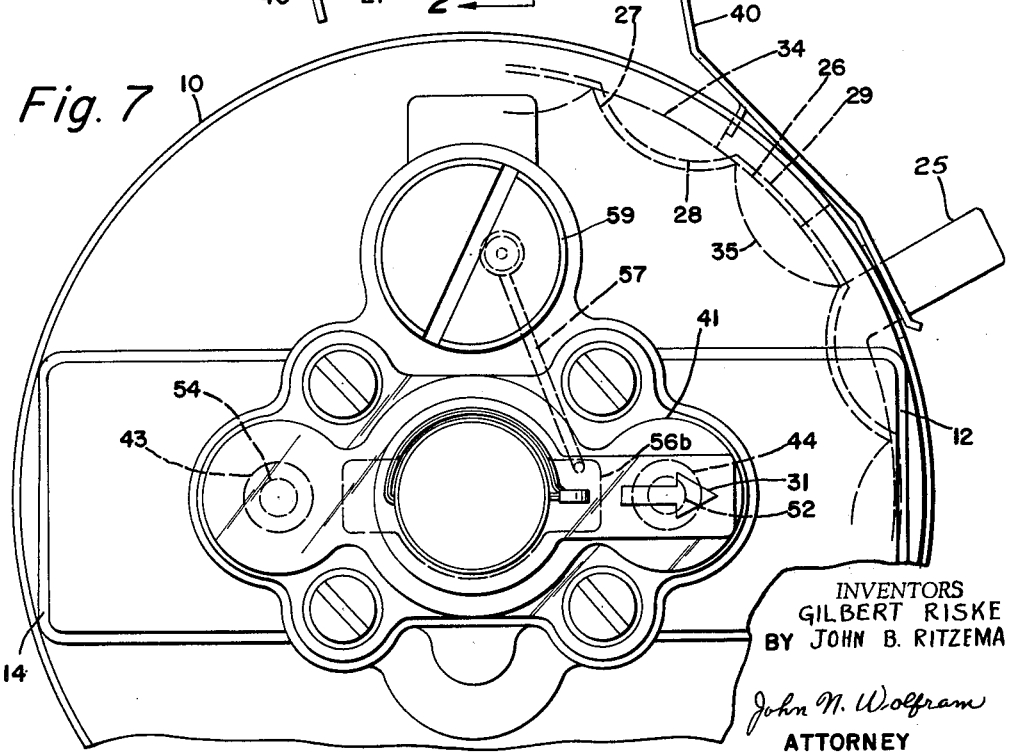

FIG. 7 is a top view showing the cap reversed 180° with respect to the lubricator body, FIG. 8 is a top view along the lines 8—8 of FIG. 1 but with cap 102b removed, and FIG. 9 is a partial section view of a modified form of bushing 101.

The lubricator includes a body member 10 having a main passageway 11 for air therethrough, said passageway including an inlet port 12, an inlet passage section 13, an outlet port 14, an outlet passage section 15, and a valve chamber 16. Inlet port 12 is for connection to a source of air under pressure and outlet port 14 is for connection to a line leading to a pneumatically operated device. As will be more fully explained, the external connection to ports 12 and 14 may be reversed under certain conditions so that port 14 becomes the inlet and port 12 the outlet.

A bowl or reservoir 19 for containing a supply of oil is attached to the lower end of body 10 and is sealed with respect thereto by a resilient packing 20. Connection of the bowl to the body may be by any convenient means but in this instance it is made with a quick clamp arrangement which includes an annular collar 21 having an internal shoulder 22 for supporting bowl 19. The bowl has an external flange 23 opposite its shoulder 22 and there is a washer 24 therebetween.

The lower portion of body 10 has a series of spaced lugs 26 spaced about its periphery with recesses 27 therebetween. Collar 21 has internal lugs 28 spaced about its bore with recesses 29 therebetween. Body lugs 26 are receivable in collar recesses 29 and collar lugs 28 are rceivable in body recesses 27 and prevent rotation of collar 21 on body 10.

Intermediate the ends of body lugs 26 is an annular groove 32 in which is mounted a lock ring 33. The lock ring has lugs 34 and recesses 35 corresponding exactly with the lugs and recesses in body 10. Lock ring 33 has a tongue 25 receivable within a slot 35 extending from one end of collar 21 when collar 21 is in position on body 10. When tongue 25 is in register with slot 35, as shown in the dotted position of FIG. 5, lugs 34 and recesses 35 of the lock ring are in a position to coincide with lugs 26 and recesses 27 of the body to permit attachment or detachment of collar 21 from body 10.

When collar 21 is in position on body 10, lock ring 33 may be rotated in groove 32 by means of tongue 25 so that the latter enters a recessed portion 36 of slot 35. In this position lugs 34 of the lock ring are rotated so that they overlie lugs 28 of the collar to prevent detachment of the collar from the body. A spring clip 37 is carried by tongue 25 and has an inwardly directed tab 38 for engaging sidewall 39 of slot 35 to prevent accidental return of lock ring 33 from its locked position to its unlock position. Tab 38 may be released from its engagement with collar sidewall 39 by manually springing clip 37 outwardly by means of tab 40, in which case tongue 25 may be moved to its unlock position shown in dotted lines of FIG. 5 to permit detachment of collar 21 from body 10.

Mounted on the upper face of body 10 by means of screws 30 is a cap 41 which is of transparent plastic. It has an arrow 31 molded or imprinted thereon for indicating the direction in which air under pressure is to pass through main passage 11.

The cap has a central bore 42 therethrough defining a chamber. There is a chamber 43 at one side of the bore and another chamber 44 on the other side thereof. Chambers 43 and 44 are spaced the same radial distance from the axis of bore 42 and are angularly spaced 180° from each other. The cap has a downwardly projecting hub 45 and a passage or slot 50 which connects chamber 43 with the lower end of hub 45. Drilled passages 46, 47 connect the chamber defined by the bore 42 with chamber 44, passage 47 passing through a drip spout 48 projecting into chamber 44. A multiple section packing 49 seals the lower end of chambers 43, 44 and also hub portion 45.

Body 10 has connected passages or openings 51, 52 leading from inlet passage section 13 to chamber 43 and passages or openings 53, 54 connecting outlet passage section 15 with chamber 44.

Body 10 has a central recess 55 for receiving hub 45 and forming a sealed chamber 56 therebetween. Chamber 56 has a central circular portion 56a and elongated first and second portions 56b and 56c on opposite sides thereof. Slot 50 connects to portion 56b. A passage 57 leads from first chamber portion 56b to a recess 58 which is closed at its lower end and is open at its upper end to a threaded opening 59. A one way check valve 60 is mounted within recess 58. Threaded opening 59 normally receives a plug 61 which is sealed therein by a packing 62. The lower end of threaded opening 59 below the bottom of plug 61 provides a space 63 which connects the upper end of recess 58 with a crescent shaped passage or opening 64 whose lower end is in communication with a recess 65 in the bottom of body 10. Recess 65 communicates with the interior of reservoir 19. Openings 59 and 64 provide a means for filling reservoir 19 with oil without removing the reservoir from the body. Plug 61 closes the filler openings between filling operations.

Mounted in valve chamber 16 is a rotary vane type valve member 70. The valve member is cylindrical except for slots 71, 72 formed on opposite sides thereof to provide flow passages for connecting inlet passage section 13 to outlet passage section 14 when valve member 70 is in the rotative position shown in FIGS. 1 and 2. Slots 71, 72 form a vane 73 which, when valve member 70 is rotated 90° from the positions shown in 1 and 2, blocks the flow of air through valve chamber 16 and hence main passage 11 and which in intermediate positions adjusts the flow rate through the main passage as desired.

Valve 70 includes a cylindrical stem portion 74 which projects through cylindrical bore 42 in the central portion of cap 43, and which at its upper end has two radial openings 75 diametrically opposite each other into which a spanner wrench or end of a drill or similar rod may be inserted for rotating valve member 70 to any desired position. This provides one of two means for adjusting the angular position of valve 70 and is intended for emergency use when it is desired to adjust the valve while reservoir 19 is attached to body 10. Radial openings 75 extend in a direction parallel with vane slots 71, 72, or in other words, parallel with vane 73 so as to also serve as an indicator to indicate the rotative position of vane 73.

The stem has a reduced diameter portion 76 forming an annular chamber 77 within bore 42, such annular chamber being closed at its upper and lower ends by resilient packing rings 78, 79. At its lower end valve member 70 has a cylindrical portion 80 within cylindrical recess 81 in body 10. Below cylindrical portion 80 is a non-circular portion 82 which may be gripped by a wrench for rotating valve member 70.

Within recess 81 are a pair of washers 83, 84 with a resilient packing ring 85 therebetween. A generally oval shaped plate 86 engages washer 84 and is fastened to body 10 by screws 87. Plate 86 is out of engagement with body 10 whereby tightening of screws 87 moves plate 86 upwardly to deform packing 85 into tight engagement with both the wall of cylindrical recess 81 and cylindrical portion 80 of the valve member. This tight engagement not only seals the valve member with respect to body recess 81 but it also provides an effective frictional lock for locking valve member 70 in the desired rotative position.

Non-circular portion 82 is utilized for setting the rotative position of valve member 70 prior to attachment of reservoir 19 to body 10 and prior to tightening of plate 86 for locking the position of valve 70. Such non-circular portions 82 and screws 87 are inaccessible after reservoir 19 is attached to the body and thus cannot be operated for changing the valve setting without removing the reservoir. The frictional locking of valve member 70 by packing 85 may be overcome in an emergency by rotating valve member 70 by means of radial openings 75, as heretofore mentioned, without removing reservoir 19 and loosening plate 86.

When assembling a group of lubricators for a particular application, the proper rotative position of valve member 70 may be determined by experiment or calculation and the position of marking 89 with respect to markings 88 noted. The remainder of the lubricators may then be assembled to the same valve setting by making the same setting of indicator mark 89 with respect to marks 88. Since valve 70 moves from an off to a full open position in 90° angular movement, indicator marks 88 need extend only through an angle of 90°. The second set of indicator marks 88' are located on the diametrically opposite side of plate 86 so as to cooperate with mark 89 in the event the position of plate 86 is reversed 180° when being installed.

Attached to the lower end of valve member 70 is an oil pickup tube 90 whose upper end extends into a recess 91 of the valve member and is retained therein by a synthetic rubber O-ring 92 engageable within groove 93 in the pickup tube and an undercut 94 in recess 91. The rubber O-ring provides both a sealed connection between the outer diameter of the pickup tube and recess 91 and a flexible mounting between the two parts. The pickup tube is made of glass or transparent plastic. The flexible mounting minimizes the chance of breakage when the tube is of a material fairly readily shatterable by impact.

Rubber O-ring 92, being resilient, will readily deform within groove 94 to permit manual attachment or detachment of pickup tube 90 from member 70 when there is no fluid pressure acting on the O-ring. However, when a higher fluid pressure is acting on one side of the O-ring than on the other the ring is held firmly within both grooves 93, 94 by such fluid pressure to lock the pickup tube securely to member 70. A check valve ball 95 closes the upper end of pickup tube 90 when oil is not passing upwardly therethrough to keep the bore of the pickup tube primed with oil. Bore 96 has a reduced portion 96a to provide a valve seat 96b engageable by ball 95, as will be later described.

Valve member 70 has an axial bore 96 leading from recess 91 to a first counterbore 97. The bottom of counterbore 97 forms an annular shoulder 98 which serves as a valve seat. Radial openings 99 connect counterbore 97 with annular chamber 77.

At the upper end of valve stem 74 is a second counterbore 100 in which there is mounted a bushing 101. Threadedly engaged within this bushing is a needle valve 102 having a seat portion 103 engageable with valve seat 98. An O-ring 104 seals needle valve 102 with respect to counterbore 100 and also serves to frictionally lock needle valve 102 in any set position. Bushing 101 is a force fit within counterbore 100 so that it does not rotate therein when needle valve 102 is rotated and thus it acts as a nut to permit upward or downward movement of needle valve 102 as the latter is rotated. Preferably, bushing 101 is initially formed with its outer surface cylindrical and is then pressed so that its cross section is slightly oval as shown in dotted line 101' of FIG. 8. It is then forced into counterbore 100 with the long diameter of the oval having an interference or press fit therein so that the bushing will be tightly anchored within the counterbore.

Optionally, the outer surface of bushing 101 may be cylindrical instead of oval and provided with longitudinally extending knurls 101b, the largest diameter across the knurls being slightly larger than the diameter of bore 100 whereby the bushing is a press fit within bore 100 and the knurl crests are somewhat embedded in the wall of bore 100 to tightly anchor the bushing against rotation.

Needle valve 102 has a screw driver slot 102a by means of which the needle valve may be rotated within bushing 101 for adjusting the position of opening of the same. After adjusting the needle valve to the desired position, slot 102a is rendered inaccessible by attaching cap 102b to valve stem 74 by means of lockwire 102c which is inserted through openings 75. The lockwire may then be sealed as at 102d.

One way valve 60 is located within recess 58 and is in the form of a tire valve such as is used in automobile tires. It has a stem 107 which when in its upper position permits valve 60 to close communication between drilled passage 57 and first chamber portion 56b. When valve stem 107 is in the lower position valve 60 is open to permit such communication. Valve stem 107 is normally urged toward its upper position by a spring 108 but is held to its lower position by abutment with the lower end of plug 61 when the latter is in position within opening 59. When plug 61 is removed, as when it is desired to fill reservoir 19 with oil through opening 59, spring 108 raises valve stem 107 to close valve 60. Closing of valve 60 in this manner shuts off the supply of air under pressure from inlet passage section 13 to the interior of reservoir 19. Otherwise there would be a constant discharge of air from inlet passage 13 through the openings in passageways connecting inlet passage 13 with clearance first chamber portion 56b and through threaded opening 59 when plug 61 is removed.

In operation, with cap 41 assembled to body 10 as shown in FIG. 1, air under pressure is introduced to main passage 11 at inlet port 12 and passes through slots 71, 72 of valve member 70 to discharge through outlet port 14. A portion of the air passes through a bypass passage comprising openings 51, 52, chamber 43, slot 50, chamber 56, passage 57, recess 58, valve 60, clearance 63, and passage 64, to reservoir 19 for pressurizing the oil therein. Oil thus pressurized passes upwardly through pickup tube 90, past ball check valve 95, through bore 96 and past valve seat 98 into counterbore 97 from which it passes through radial openings 99 into chamber 77. In the event cap 102b and needle valve 103 are removed from the lubricator, pressurizing of the oil in reservoir 19 will cause oil from passage 96 to spill freely to the exterior of the lubricator through bushing 101. The resultant increased pressure differential across ball check 95 will cause it to move upwardly against upper seat 96b to stop the oil flow. Seat 96b is spaced a substantial distance above the lower seat on the pickup tube so that ball 95 will not seat therein during normal operation of the lubricator.

From chamber 77 the oil passes into passages 46, 47 then drips through chamber 44 and openings 54 and 53 to outlet passage section 15 where it is broken up into small particles by the air passing therethrough and is entrained in such air for discharge through outlet port 14. The amount of oil which is thus delivered from reservoir 19 to outlet port 14 at any given air pressure within reservoir 19 can be varied by adjusting the position of needle valve 102 with respect to seat 98. In this connection, it will be noted that the lower end of needle valve 102 has a fairly close clearance with respect to counterbore 97. Also, the length of this clearance between seat 98 and openings 99 is of substantial length. With this arrangement, the restriction between needle valve seat portion 103 and seat 98 is the controlling factor for adjusting the flow rate of the oil during the first part of the opening movement of needle valve 102 but the length of the clearance between needle valve 102 and counterbore 97 becomes the controlling factor during continued upward movement of the needle valve.

It should also be noted that valve 70 is provided for causing a pressure differential between the air in reservoir 19 and that in chamber 44, it being this differential which causes the feeding of oil from reservoir 19 to drip spout 48. The pressure in reservoir 19 is dependent upon the pressure in inlet section 13 and pressure in chamber 44 is dependent upon the pressure in outlet section 15. Thus valve 70 is adjusted to provide the minimum pressure drop between inlet and outlet sections 13 and 15 for establishing the minimum pressure differential between reservoir 19 and chamber 44 to cause oil to flow therebetween.

Figure 2:
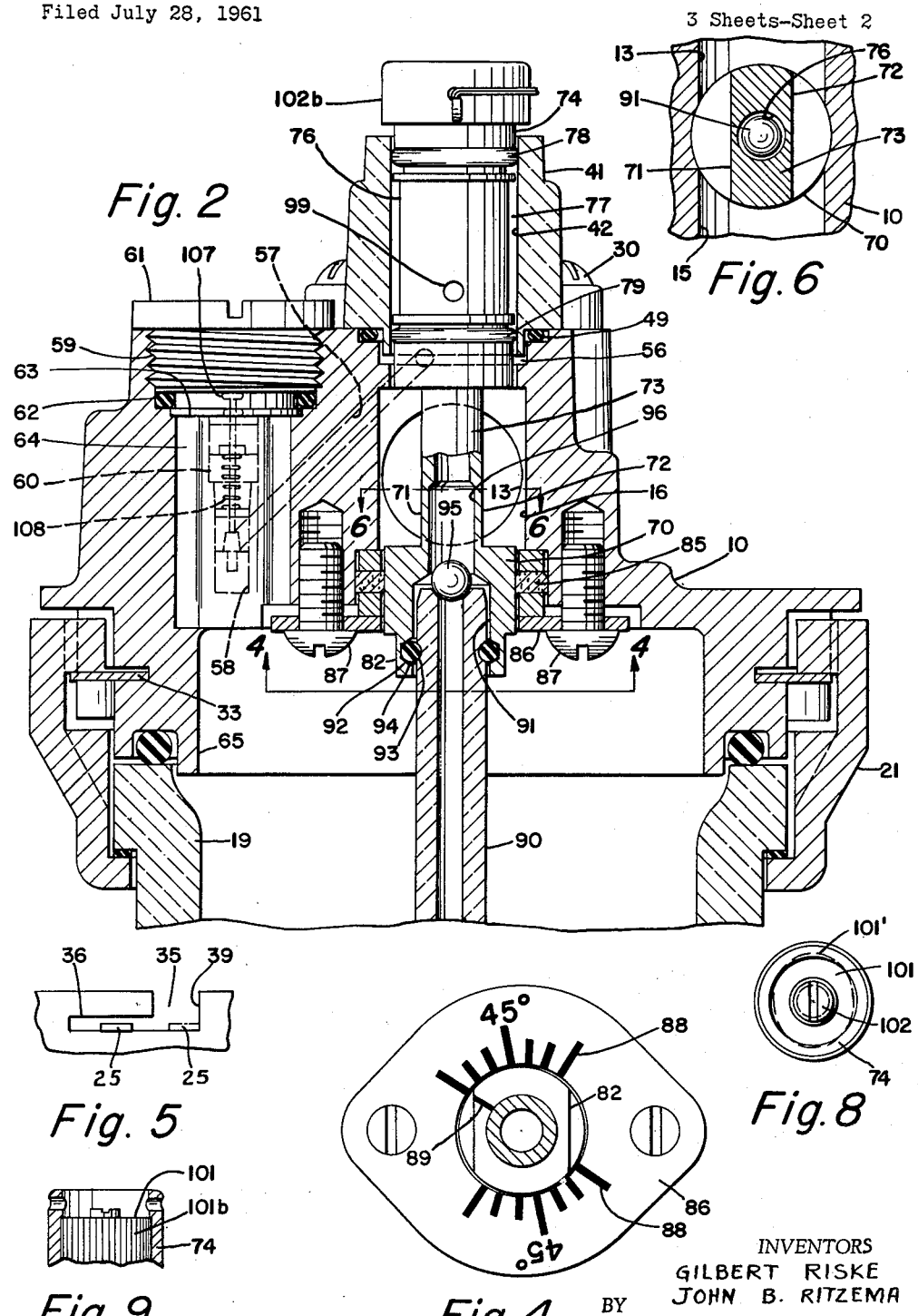
FIG. 2 is a cross section view through the lines 2—2 of FIG. 3.
Figure 3:
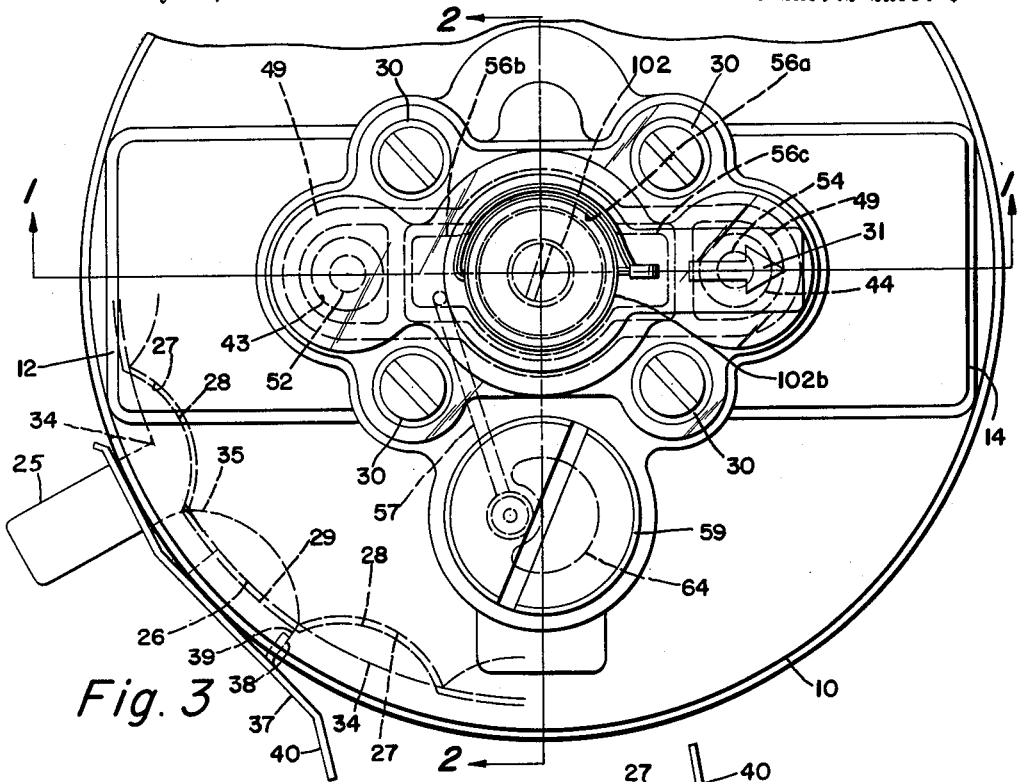
FIG. 3 is a top view.

In the operation just described, the flow of air through main passage 11 from inlet port 12 to outlet port 14 is in the rightward direction as viewed in FIG. 2, and filler opening 59 is toward the lower side of this figure. As previously mentioned, it may be that in a particular installation filler opening 59 when in this location is next to a part of a machine and is not readily accessible. In such case it is desirable to rotate body 10 180° so that the filler opening will be on the upper side as shown in FIG. 7. This places port 12 to the right and port 14 to the left, the reverse of the position shown in FIG. 2. If no other change is made, port 12 would still be the inlet and port 14 the outlet and thus the direction of air flow through main passage would have to be from right to left, as viewed in FIGURE 7. Since this might necessitate undesirable rearrangement of the piping on the machine, provision is made in the lubricator whereby port 14 may become the inlet and port 12 the outlet. This is done by simply reversing the position of cap 41 180° on body 10, as shown in FIG. 7. Such reversal also changes the direction in which arrow 31 points so that it correctly indicates that the direction of air flow is to be from port 14 toward port 12.

In making such reversal of cap 41 on body 10, chamber 43 becomes aligned with body opening 54, chamber 44 becomes aligned with body opening 52, and slot 50 becomes aligned with portion 56c of chamber 56. As air is introduced into port 14 part of the air passes through openings 53 and 54 to chamber 43 and slot 50 into chamber 56 from where it passes through the remaining bypass passages previously described into reservoir 19 for pressurizing the same. Meanwhile, oil from the reservoir is delivered through pickup tube 90 to passage 47 in drip spout 48, as previously described, from where it drips through chamber 44 and openings 52 and 51 into passage portion 13, the latter now being on the downstream side of valve 70. From passage portion 13 air with oil entrained therein passes through port 12 to the system to be operated.

Thus by simply reversing cap 41 on body 10 the lubricator is automatically conditioned for reversing the direction of air flow through the body and indicator arrow 31 automatically indicates the proper direction of air flow.

One embodiment of the invention is shown in the drawings but it is obvious that many changes in the detail construction may be made without departing from the inventive concepts defined by the following claims.

I claim:

1. In an airline lubricator, a body having a main passage therethrough which includes inlet and outlet openings, means on said body defining a reservoir for oil, a removable cap mounted on said body in a first fixedly secured position, said cap having first, second, and third chambers therein, a fourth chamber formed between said body and cap, a first passage in said body connecting said inlet opening with said first chamber, a second passage in said body connecting said outlet opening with said second chamber, a third passage in said cap connecting said second and third chambers, a fourth passage in said cap connecting said first and fourth chambers, conduit means connecting said reservoir with said third passage, a fifth passage in said body in communication with said fourth chamber and said reservoir, said first and second passages and said first and second chambers being symmetrically located on opposite sides of an axis through said body and cap whereby said cap may be rotated about said axis to a second fixedly secured position in which said first passage communicates with said second chamber and said second passage communicates with said first chamber.

2. An airline lubricator in accordance with claim 1 in which said third and fourth chambers surround said axis.

3. A lubricator in accordance with claim 1 in which said cap has a direction indicator thereon which points in the direction from said inlet opening toward said outlet opening in said first position and from said outlet opening toward said inlet opening in said second position.

4. A lubricator in accordance with claim 1 in which said body has a filler opening leading to said reservoir, a removable plug for closing said filler opening, and a valve for opening and closing said fifth passage, and means whereby said valve closes in response to removal of said plug and opens in response to replacement of said plug for closing said filler opening.

5. A lubricator in accordance with claim 1 in which at least that portion of the cap in which said second chamber is formed is transparent.

6. A lubricator in accordance with claim 1 in which said first and second passages are spaced 180° apart about said axis.

7. A lubricator in accordance with claim 1 in which there is a valve chamber in said main passage between said inlet and outlet openings, a rotary valve member in said valve chamber for controlling flow of air through said main passage, an operating stem for said valve member projecting through a cylindrical bore in said cap, and the axis of said bore being coincident with said axis through said body and cap whereby said cap may be rotated from said first position to said second position without interference from said stem.

8. A lubricator in accordance with claim 7 in which said third chamber comprises an annular space between said stem and the wall of said bore.

9. A lubricator in accordance with claim 1 in which said fourth chamber has first and second portions symmetrically spaced about said axis and said fourth passage is in register with said first portion in said first position and with said second portion in said second position.

10. A lubricator in accordance with claim 1 in which there is a valve chamber in said main passage between said inlet and outlet openings, a rotary valve member in said chamber for controlling flow of air through said main passage, and said conduit means includes a passage through the central portion of said valve member.

11. A lubricator in accordance with claim 1 in which said body has a filler opening adjacent said cap leading to said reservoir, and said cap clears said opening in both said first and second positions thereof.

12. A lubricator in accordance with claim 1 in which said third passage includes a portion which registers with said second passage when said cap is in said first position and which registers with said first passage when said cap is in said second position.

13. In an airline lubricator, a body having a main passage therethrough which includes inlet and outlet openings, means on said body defining a reservoir for oil, a removable cap mounted on said body in a first fixedly secured position, said cap having first, second, and third chambers therein, said third chamber being located about an axis of said cap, said first and second chambers being spaced from said third chamber on opposite sides therefrom, a fourth chamber between said body and cap and surrounding said axis, a first passage in said body connecting said inlet opening with said first chamber, a second passage in said cap connecting said second chamber with said outlet opening, a third passage in said cap connecting said third and second chambers, a fourth passage in said cap connecting said first and fourth chambers, a fifth passage in said body in communication with said fourth chamber and said reservoir, a conduit through said body connecting said reservoir with said third chamber, a valve chamber in said main passage between said inlet and outlet openings, a rotary valve member in said valve chamber for controlling flow of air through said main passage, said valve member extending through said fourth chamber into said third chamber, means for sealing said third chamber from said fourth chamber, said first and second passages and said first and second chambers being symmetrically located about said axis whereby said cap may be rotated about said axis to a second fixedly secured position in which said first passage communicates with said second chamber and said second chamber communicates with said first chamber.

14. A lubricator in accordance with claim 13 in which said second chamber is sealed from said fourth chamber.

15. A lubricator in accordance with claim 1 in which a single packing member seals said cap with respect to said body, seals said second chamber from said fourth chamber, and seals said first chamber from said fourth chamber except for said fourth passage.

16. In an airline lubricator, a housing having a main passage for passing air under pressure therethrough, said main passage including inlet and outlet openings and a valve chamber therebetween, a reservoir for oil detachably connected to said body, first passage means for directing air under pressure from said inlet opening to said reservoir for pressurizing oil therein, second passage means for delivering oil from said reservoir to said outlet opening, a valve member in said valve chamber rotatable to predetermined positions for regulating the passage of air through said main passage, locking means in said housing for locking said valve member in a predetermined rotative position, said valve member being received in said locking means, said locking means being inaccessible except when said reservoir is detached from said housing, said locking means including a resilient member which engages said housing and said valve member to provide both a seal and a friction lock therebetween, and clamping means for adjustably applying clamping pressure to said resilient member for varying the pressure of its engagement with said housing and said valve member.

17. In an airline lubricator, a housing having a main passage for passing air under pressure therethrough, said main passage including inlet and outlet openings, a reservoir for oil on said body, first passage means for directing air under pressure from said inlet opening to said reservoir for pressurizing oil therein, second passage means for delivering oil from said reservoir to said outlet opening, a valve stem having a cylindrical bore positioned within said housing, a bushing inserted within said bore, said bushing prior to insertion in said bore having an outer surface non-circular in cross section with at least one diameter thereof greater than the diameter of said bore, said bushing after insertion into said bore having its cross section distorted so as to fit within said bore with portions of said outer surface in tight frictional engagement therewith, a valve member threadedly engaged with said bushing and projecting into said second passage means for controlling the flow of oil therethrough.

18. In an airline lubricator, a housing having a main passage for passing air under pressure therethrough, said main passage including inlet and outlet openings and a valve chamber therebetween, a reservoir for oil on said body, first passage means for directing air under pressure from said inlet opening to said reservoir for pressurizing oil therein, second passage means for delivering oil from said reservoir to said outlet opening, a valve stem having a cylindrical bore positioned within said housing, a bushing having an outer cylindrical surface with longitudinally extending knurls press fitted within said bore with said knurls gripping said bore so as to prevent rotation of said bushing within said bore, a valve member threadedly engaged with said bushing and projecting into said second passage means for controlling the flow of oil therethrough.

19. In an airline lubricator, a body having a main passage therethrough for air under pressure, a reservoir for oil attached to said body, a valve member in said body for controlling the flow of air through said main passage, a first passage for bypassing air from said main passage to said reservoir for pressurizing oil therein, a second passage for delivering oil from said reservoir to said main passage, said second passage including a pickup tube and a bore through said valve member, said valve member having a recess leading to said bore and into which recess said pickup tube extends, an undercut groove in said recess, a groove in said pickup tube opposite said undercut groove, and a resilient member extending into both said grooves for retaining and sealing said pickup tube within said recess opposing surfaces of said pickup tube and said recess defining cooperative valve seats.

20. An airline lubricator in accordance with claim 19 in which said resilient member is circular in cross section and is readily deformable from one of said grooves into the other of said grooves when subjected to substantially equal fluid pressures on opposite sides thereof whereby said pickup tube may be readily inserted or removed from said recess, and said resilient member is tightly confined in both said grooves by a differential in said fluid pressures whereby said pickup tube is tightly retained in said recess when said pressure differential exists.

21. In an airline lubricator, a housing having a main passage for passing air under pressure therethrough, said main passage including inlet and outlet openings, a reservoir for oil on said body, first passage means for directing air under pressure from said inlet opening to said reservoir for pressurizing oil therein, second passage means for delivering oil from said reservoir to said outlet opening, an adjustable valve mounted in said second passage means for adjustably restricting the flow of oil therethrough, upper and lower valve seats within said second passage means between said reservoir and said adjustable valve, a check valve between said seats, said check valve being movable against said upper seat to close off said second passage means when the fluid pressure therein below said check valve is greater by a predetermined amount than the pressure of fluid above said check valve, and said check valve being seatable on said lower seat for closing said second passage means when the oil in said reservoir is unpressurized.

22. In an airline lubricator, a housing having a main passage for passing air under pressure therethrough, said main passage including inlet and outlet openings and a valve chamber therebetween, a reservoir for oil on said body, first passage means for directing air under pressure from said inlet opening to said reservoir for pressurizing the oil therein, second passage means for delivering oil from said reservoir to said outlet opening, a rotatable valve member in said valve chamber for controlling the passage of air through said main passage, at least a portion of said second passage means being located within said valve member, a needle valve adjustably mounted within said valve member and extending into said second passage means for controlling the amount of oil passing therethrough, means on said needle valve for adjusting the position of the same, a closure member removably attached to said valve member and covering said means to render the same inaccessible.

23. In an airline lubricator, a housing having a main passage for passing air under pressure therethrough, said main passage including inlet and outlet openings and a valve chamber therebetween, a reservoir for oil detachably connected to said body, first passage means for directing air under pressure from said inlet opening to said reservoir for pressurizing oil therein, second passage means for delivering oil from said reservoir to said outlet opening, a valve member in said valve chamber rotatable to predetermined positions for regulating the passage of air through said main passage, expandable locking means in said housing between said valve member and said valve chamber for locking said valve member in a predetermined rotated position, said valve member being received in said expandable locking means, said expandable locking means including means for adjustably expanding said locking means between said valve member and said valve chamber, and said last-mentioned means being inaccessible except when said reservoir is detached from said housing.

24. A lubricator in accordance with claim 23 in which said adjustable expandable locking means includes a resilient member which engages said housing and said valve member to provide both a seal and a friction lock therebetween.

25. A lubricator in accordance with claim 23 in which said adjustable expandable locking means includes a non-rotatable member having reference markings cooperable with a reference mark on said valve member for indicating the rotative positioning of said valve member with respect to said body.

26. A lubricator in accordance with claim 23 in which said valve member includes a stem portion projecting from said housing and said stem portion has means thereon whereby said valve member may be rotated despite the operation of said adjustable expandable locking means.

References Cited in the file of this patent

UNITED STATES PATENTS

| | | |
|---|---|---|
| 1,822,092 | Hansen | Sept. 8, 1931 |
| 2,571,770 | Semon | Oct. 16, 1951 |
| 2,661,814 | Norgren | Dec. 8, 1953 |
| 2,747,688 | Faust | May 29, 1956 |
| 2,751,045 | Faust | June 19, 1956 |
| 2,792,203 | Olson et al. | May 14, 1957 |
| 2,807,332 | Briechle | Sept. 24, 1957 |
| 2,921,649 | Wilkerson | Jan. 19, 1960 |
| 2,926,620 | Fried | Mar. 1, 1960 |
| 3,013,820 | Pouppirt | Dec. 19, 1961 |

FOREIGN PATENTS

| | | |
|---|---|---|
| 694,905 | Great Britain | July 29, 1953 |